United States Patent
Eom et al.

(10) Patent No.: US 10,424,783 B2
(45) Date of Patent: Sep. 24, 2019

(54) COMPOSITE ANODE ACTIVE MATERIAL, LITHIUM BATTERY INCLUDING THE SAME, AND METHOD OF PREPARING THE COMPOSITE ANODE ACTIVE MATERIAL

(71) Applicant: SAMSUNG SDI CO., LTD., Yongin-si, Gyeonggi-do (KR)

(72) Inventors: Hyeri Eom, Yongin-si (KR); Sora Lee, Yongin-si (KR); Changsu Shin, Yongin-si (KR); Chang Ui Jeong, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 15/255,310

(22) Filed: Sep. 2, 2016

(65) Prior Publication Data

US 2017/0069909 A1   Mar. 9, 2017

(30) Foreign Application Priority Data

Sep. 3, 2015   (KR) ........................ 10-2015-0124950

(51) Int. Cl.
| | |
|---|---|
| *H01M 4/36* | (2006.01) |
| *H01M 4/58* | (2010.01) |
| *H01M 4/62* | (2006.01) |
| *H01M 4/38* | (2006.01) |
| *H01M 10/0525* | (2010.01) |
| *H01M 4/02* | (2006.01) |

(52) U.S. Cl.
CPC ........... *H01M 4/366* (2013.01); *H01M 4/386* (2013.01); *H01M 4/582* (2013.01); *H01M 4/625* (2013.01); *H01M 10/0525* (2013.01); *H01M 2004/027* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 7,674,552 B2 | 3/2010 | Nakai et al. | |
| 2011/0097629 A1* | 4/2011 | Yew ...................... | H01M 4/134 429/231.8 |
| 2012/0270108 A1* | 10/2012 | Shin ....................... | B82Y 30/00 429/226 |
| 2015/0008374 A1* | 1/2015 | Kim ....................... | H01M 4/386 252/503 |
| 2015/0280223 A1 | 10/2015 | Chang et al. | |
| 2016/0111718 A1* | 4/2016 | Figgemeier ........... | H01M 4/134 429/221 |

FOREIGN PATENT DOCUMENTS

| | | |
|---|---|---|
| JP | 2012-099341 A | 5/2012 |
| KR | 10-2006-0071892 A | 6/2006 |
| KR | 10-2014-0082225 A | 7/2014 |
| WO | WO 2014/088187 A1 | 6/2014 |

* cited by examiner

*Primary Examiner* — Sin J Lee
(74) *Attorney, Agent, or Firm* — Lee & Morse, P.C.

(57) ABSTRACT

A composite anode active material includes a metallic core alloyable with lithium, and a coating layer on the metallic core, the coating layer including lithium fluoride (LiF) nanoparticles and a carbonaceous material.

9 Claims, 9 Drawing Sheets

COMPOSITE ANODE ACTIVE MATERIAL, LITHIUM BATTERY INCLUDING THE SAME, AND METHOD OF PREPARING THE COMPOSITE ANODE ACTIVE MATERIAL

CROSS-REFERENCE TO RELATED APPLICATION

Korean Patent Application No. 10-2015-0124950, filed on Sep. 3, 2015, in the Korean Intellectual Property Office, and entitled: "Composite Anode Active Material, Lithium Battery Including the Same, and Method of Preparing the Composite Anode Active Material," is incorporated by reference herein in its entirety.

BACKGROUND

1. Field

Embodiments relate to a composite anode active material, a lithium battery including the same, and a method of preparing the composite anode active material.

2. Description of the Related Art

Demand for secondary batteries applicable to portable electronic devices for information and communication, such as personal digital assistants (PDAs), mobile phones, or laptops, or to electric bicycles, electric vehicles, or power storage devices applied to a smart grid has been increasing. A lithium battery, more specifically, a lithium secondary battery, has been adopted as a power source for electric vehicles or for power storage devices in addition to a power source for portable IT devices, due to its high energy density and easiness in its design.

SUMMARY

Embodiments are directed to a composite anode active material including a metallic core alloyable with lithium, and a coating layer on the metallic core, the coating layer including lithium fluoride (LiF) nanoparticles and a carbonaceous material.

The LiF nanoparticles may include primary particles having an average particle size in a range of about 10 nm to about 900 nm.

The carbonaceous material may include at least one of graphite, a carbon nanotube, a carbon nanofiber, a carbon nanorod, a carbon nanoribbon, graphene, soft carbon, hard carbon, meso-phase pitch carbide, and sintered cork.

The metallic core may include a silicon-based alloy represented by Formula 1:

$$x\text{Si-}y\text{Fe-}z\text{M} \qquad \text{[Formula 1]}$$

wherein, in Formula 1, $50 \leq x \leq 90$, $5 \leq y \leq 30$, $5 \leq z \leq 30$, $x+y+z=100$, and M is at least one selected from carbon (C), aluminum (Al), titanium (Ti), chromium (Cr), manganese (Mn), cobalt (Co), nickel (Ni), magnesium (Mg), copper (Cu), sulfur (S), selenium (Se), tellurium (Te), tin (Sn), indium (In), gallium (Ga), germanium (Ge), arsenic (As), lead (Pb), palladium (Pd), bismuth (Bi), zinc (Zn), tungsten (W), and silver (Ag).

The metallic core including the silicon-based alloy may have an average particle diameter D50 in a range of about 0.3 μm to about 20 μm.

The LiF nanoparticles may be present in an amount ranging from about 0.1 parts by weight to about 7.0 parts by weight based on 100 parts by weight of the metallic core.

The carbonaceous material may be in an amount ranging from about 1.0 part by weight to about 30 parts by weight based on 100 parts by weight of the metallic core.

Embodiments are also directed to a lithium battery including a cathode including a cathode active material, an anode including the composite anode active material as described above, and an electrolyte disposed between the cathode and the anode.

Embodiments are also directed to a method of preparing the composite anode active material as described above, including mixing lithium fluoride (LiF) nanoparticles and a metallic core alloyable with lithium to obtain a mixture thereof, and adding a carbonaceous material to the mixture to coat the metallic core with the carbonaceous material and the LiF nanoparticles through mechanical processing and heat treating.

The mechanical processing may include a milling process or a mechanofusion process.

The heat treating may be performed at a temperature in a range of about 300° C. to about 700° C. in air or in an oxygen atmosphere.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "between" two layers, it can be the only layer between the two layers, or one or more intervening layers may also be present. Like reference numerals refer to like elements throughout.

Figure 1:
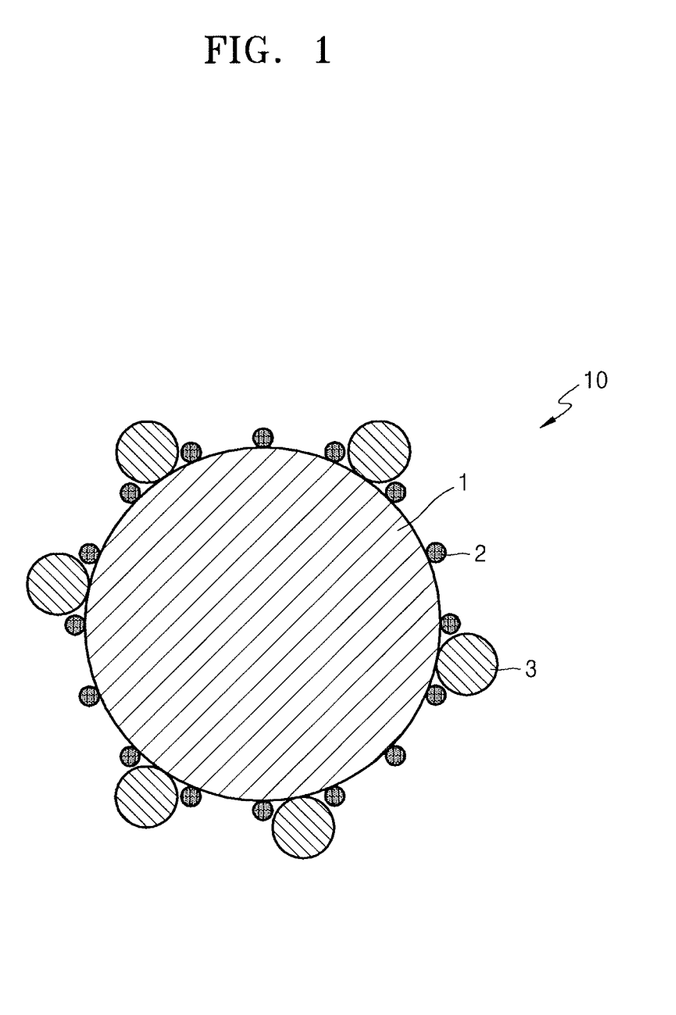
FIG. 1 illustrates a schematic diagram depicting a composite anode active material according to an exemplary embodiment.

FIG. 1 illustrates a schematic diagram depicting a composite anode active material according to an exemplary embodiment.

According to the embodiment, the composite anode active material 10 may include a coating layer disposed on a metallic core 1 alloyable with lithium. The coating layer may include lithium fluoride (LiF) nanoparticles 2 and carbonaceous materials 3.

The coating layer may be a coating layer directly including the LiF nanoparticles 2 and the carbonaceous materials 3 on the metallic core 1 alloyable with lithium. The LiF nanoparticles 2 may form a uniform coating layer on the metallic core 1 alloyable with lithium. A composite anode active material 10 having improved lifespan characteristics may be provided while a path of sufficient electrical conductivity may be ensured during a repeated charge and discharge process.

The LiF nanoparticles 2 may have an average particle diameter of less than 1 μm. The LiF nanoparticles 2 may be, for example, primary particles having an average particle diameter in a range of about 10 nm to about 900 nm, or, for example, primary particles having an average particle diameter in a range of about 50 nm to about 800 nm, or, for example, primary particles having an average particle diameter in a range of about 100 nm to about 700 nm, or for example, primary particles having an average particle diameter in a range of about 200 nm to about 600 nm.

The primary LiF nanoparticles having the average particle diameter within the ranges above may be primary particles that do not agglomerate together. The primary LiF nanoparticles may be uniformly distributed and coated on the metallic core alloyable with lithium to facilitate intercalation/deintercalation of lithium between an electrolyte and the metallic core alloyable with lithium during charging and discharging a lithium battery. In this regard, the composite anode active material having improved lifespan characteristics may be provided while a path of sufficient electrical conductivity may be ensured during a charge and discharge process. The LiF nanoparticles may be prepared in various forms such as powder form, flake form, or colloidal form.

The term "average particle diameter refers" to "D50", which is a value of particle diameter at 50% in a cumulative distribution curve in which the particles are cumulatively distributed from the smallest to the largest particles based on 100% of the total number of the particles. D50 may be measured by methods widely known in the art. For example, the D50 may be measured by using a particle size analyzer, a transmission electron microscope (TEM) or a scanning electron microscope (SEM). As another example, the D50 may be measured by using a dynamic light-scattering device, and then, performing data analysis to count the number of particles in each size range to calculate the average particle diameter.

The LiF nanoparticles may be in a form of, for example, a sphere or oval. The LiF nanoparticles may have an average particle diameter in a range of about 100 nm to about 700 nm to be uniformly distributed on the metallic core alloyable with lithium. The shape, the average particle diameter, and the distribution of the LiF nanoparticles may be identified through SEM and TEM images as described below. The LiF nanoparticles may be uniformly coated with a uniform size on the metallic core such that a composite anode active material having improved lifespan characteristics may be provided.

The carbonaceous material may include at least one of graphite, a carbon nanotube, a carbon nanofiber, a carbon nanorod, a carbon nanoribbon, graphene, soft carbon, hard carbon, meso-phase pitch carbide, and sintered cork. For example, the carbonaceous material may include at least one of pitch carbide, sintered cork, and a combination thereof.

Graphite may include particles having an average particle diameter in a range of about 12 to about 20 μm. For example, graphite may include particles having an average particle diameter in a range of about 15 to about 18 μm.

The carbon nanotube may be a nano-sized carbon nanotube having an average particle diameter of less than 1 μm. The carbon nanotube may have an average particle diameter of, for example, about 500 nm or less. The carbon nanotube may have an average particle diameter of, for example, about 300 nm or less, or, for example, about 200 nm or less, or, for example, about 100 nm or less, or, for example, about 50 nm or less. The carbon nanotube may include a single-walled carbon nanotube, a multi-walled carbon nanotube, or a combination thereof.

The carbon nanofiber may be a nano-sized fiber having an average particle diameter of less than 1 μm and a large value for an aspect ratio. For example, the aspect ratio may be 1 or more. The carbon nanorod may be similar to the carbon nanofiber, but may have a smaller aspect ratio than that of the carbon nanofiber. The carbon nanoribbon may be similar to graphene, and may have a width of about 50 nm or less.

Graphene may include a polycyclic nano-sheet in which rings formed by connecting six carbon atoms in a hexagonal shape are condensed to each other and arranged on one plane. The expression "arranged on one plane" used herein indicates that a plurality of 6-membered carbon rings are condensed side by side to be aligned and extended. The expression "arranged on one plane" may exclude 6-membered carbon rings that are condensed vertically to be aligned and extended.

In the polycyclic nano-sheet, adjacent carbons may be connected with each other through a $sp^2$ bond. Accordingly, the 6-membered carbon ring may have a resonance structure such that electrons may easily move therein. The polycyclic nano-sheet may be laminated in a vertical direction to the plane on which a plurality of the 6-membered carbon rings are condensed with each other and aligned.

Graphene may have a thickness of 1 to 100 layers, or, for example, a thickness of 1 to 30 layers, or, for example, a thickness of 1 to 10 layers.

Graphene may have a specific surface area of about 1,500 $m^2/g$, or, for example, a specific surface area of about 1,000 $m^2/g$, or, for example, a specific surface area in a range of about 5 to about 600 $m^2/g$. The specific surface area of graphene may be measured by using a Brunauer Emmett Teller (BET) analyzer according to methods known in the art.

When the coating layer includes graphene having a thickness and specific surface area within the ranges above, a path of sufficient electrical conductivity may be ensured.

The metallic core may include a silicon (Si)-based core represented by Formula 1 below. The Si-based core may include Si in an amount of about 50 weight % or more. The Si-based core may include a metallic material, a carbonaceous material, or a combination thereof, other than Si.

The Si-based core may include a Si-based alloy represented by Formula 1.

$x$Si-$y$Fe-$z$M  [Formula 1]

In Formula 1, 50≤x≤90, 5≤y≤30, 5≤z≤30, and x+y+z=100. M may include at least one of carbon (C), aluminum (Al), titanium (Ti), chromium (Cr), manganese (Mn), cobalt (Co), nickel (Ni), magnesium (Mg), copper (Cu), sulfur (S), selenium (Se), tellurium (Te), tin (Sn), indium (In), gallium (Ga), germanium (Ge), arsenic (As), lead (Pb), palladium (Pd), bismuth (Bi), zinc (Zn), tungsten (W), or silver (Ag). For example, M may include at least one of C, Al, Ti, Cr, Mn, Co, Ni, Mg, Cu, S, Se, Te, or Sn, or for example, may include at least one of C, Al, Ti, Cr, Mn, Co, Ni, Mg, or Cu. The Si-based core may be used to implement a high-capacity battery.

The Si-based core may have a D50 in a range of about 0.3 μm to about 20 μm, or, for example, about 1 μm to about 20 μm, or, for example, about 1 μm to about 10 μm. Here, the term "D50" used herein refers to a value of particle diameter at 50% in a cumulative distribution curve in which the particles are cumulatively distributed from the smallest to the largest particles based on 100% of the total number of the particles. The D50 may be measured by methods widely known in the art, and for example, may be measured by using a particle size analyzer, a TEM image, or an SEM image. As another example, the D50 may be measured by using a dynamic light-scattering device, and then, performing data analysis to count the number of particles in each size range to calculate the average particle diameter.

The LiF nanoparticles may be in an amount in a range of about 0.1 to about 7.0 parts by weight based on 100 parts by weight of the metallic core. For example, the LiF nanoparticles may be in an amount in a range of about 0.1 to about 6.0 parts by weight based on 100 parts by weight of the metallic core. For example, the LiF nanoparticles may be in an amount in a range of about 0.1 to about 5.0 parts by weight based on 100 parts by weight of the metallic core. When the coating layer includes the LiF nanoparticles in the amount within the ranges above, a composite anode active material including the coating layer may maintain high capacity, ensure a path of sufficient electrical conductivity during a charge and discharge process, and have further improved lifespan characteristics.

The carbonaceous material may be in an amount in a range of about 1.0 to about 30 parts by weight based on 100 parts by weight of the metallic core, for example. For example, the carbonaceous material may be in an amount in a range of about 1.0 to about 25 parts by weight based on 100 parts by weight of the metallic core. For example, the carbonaceous material may be in an amount in a range of about 1.0 to about 23 parts by weight based on 100 parts by weight of the metallic core. When the coating layer includes the carbonaceous material in the amount within the ranges above, a composite anode active material including the coating layer may improve its electrical conductivity.

According to an embodiment, a lithium battery may include a cathode including a cathode active material, the anode including the composite anode active material described above, and an electrolyte between the cathode and the anode The anode may be, for example, prepared as follows.

An anode active material, a binder, and a solvent may be mixed to prepare an active material composition that is used to prepare the anode. If desired, the anode active material composition may further include a conducting agent. The anode may be prepared by directly coating the anode active material composition onto a copper current collector and drying to form an anode active material film thereon. In some implementations, the anode may be prepared by casting the anode active material composition onto a separate support to form an anode active material film, which may then be separated from the support and laminated on a copper current collector.

The anode active material may include the composite anode active material described above. The anode active material may include, in addition to the composite anode active material described above, a lithium metal, a metallic material alloyable with lithium, a transition metal oxide, a material that is doped or undoped with lithium, or a material that allows reversible intercalation and deintercalation of lithium ions.

Examples of the transition metal oxide include a vanadium oxide and a lithium vanadium oxide. Examples of the material that allows reversible intercalation and deintercalation of lithium ions include Si, $SiO_x$ (where $0<x<2$), Sn, $SnO_2$, Sn—$Y_1$ (in which $Y_1$ is an alkali metal element, an alkali earth metal element, elements of Groups 13 to 16, a transition metal, a rare earth element, or a combination thereof, except that $Y_1$ is not Sn), and $SiO_2$ in combination with at least one of the above-described materials. $Y_1$ may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), Cr (chromium), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), Ge, phosphorus (P), arsenic (As), antimony (Sb), bismuth (Bi), sulfur (S), selenium (Se), tellurium (Te), polonium (Po), or a combination thereof.

The material that allows reversible intercalation and deintercalation of lithium ions may be any carbon-based material that is suitable for use in a lithium battery. Examples of appropriate suitable carbon-based material used in a lithium battery include crystalline carbon, amorphous carbon, or mixtures thereof. Examples of the crystalline carbon include natural graphite or artificial graphite that is in amorphous, plate, flake, spherical, or fibrous form. Examples of the amorphous carbon include soft carbon (e.g., carbon sintered at low temperatures), hard carbon, mesophase pitch carbides, sintered cork, etc.

A suitable conducting agent for use in a lithium battery may be used. Examples of the conducting agent include carbon black, graphite particulates, natural graphite, artificial graphite, acetylene black, Ketchen black, or carbon fibers, carbon nanotubes; metal powders, metal tubes or metal tubes of Cu, Ni, Al, or Ag; or conductive polymers such as polyphenylene derivatives.

A binder suitable for use in a lithium battery may be used. Examples of the binder include vinylidene fluoride/ hexafluoropropylene copolymer, polyvinylidene fluoride (PVDF), polyacrylonitrile, polymethylmethacrylate, polytetrafluoroethylene (PTFE), mixtures of the above-described materials, or rubber-based polymer such as styrene butadiene. Examples of the solvent include N-methylpyrrolidone (NMP), acetone, or water.

An amount of the anode active material, the conducting agent, the binder, and the solvent may be within amount ranges generally used in the art.

The cathode may be prepared in the same manner as in the preparation of the anode, except that a cathode active material is used instead of the anode active material.

The cathode may be, for example, prepared as follows.

As described above in connection with the preparation of the anode, a cathode active material, a binder, and a solvent, and optionally a conducting agent, may be mixed to prepare a cathode active material composition. Then, the cathode may be prepared by directly coating the cathode active material composition onto an aluminum copper current collector and drying. In some implementations, the cathode may be prepared by casting the cathode active material composition onto a separate support to form a cathode active material film, which may then be separated from the support and laminated on the aluminum current collector.

As the cathode active material, a suitable material generally used in the art may be used. For example, the cathode active material may be a compound that allows reversible intercalation and deintercalation of lithium ions. For example, the cathode active material may include at least one composite oxide of lithium and a metal selected from Co, Mn, Ni, or a combination thereof. The composite oxide may be, for example, a compound represented by one of formulae such as $Li_aA_{1-b}B'_bD'_2$ (where $0.90 \leq a \leq 1.8$, and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.5$, and $0 \leq c \leq 0.05$, $0 < \alpha \leq 2$); $Li_aNi_{1-b-c}Co_bB'_cO_{2-\alpha}F_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_2$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_b Co_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In formulae above, A, B', D', E, G, Q, I', and J represent variables according to the following definitions: A may include at least one of Ni, Co, and Mn; B' may include at least one of Al, Ni, Co, Mn, Cr, Fe, Mg, Sr, V, and an alkali rare earth element; D' may include at least one of O, F, S, and P; E may include at least one of Co and Mn; G may include at least one of Al, Cr, Mn, Fe, Mg, La, Ce, Sr, and V; Q may include at least one of Ti, Mo, and Mn; I' may include at least one of Cr, V, Fe, Sc, and Y; and J may include at least one of V, Cr, Mn, Co, Ni, and Cu.

Examples of the cathode active material include $LiMn_2O_4$, $LiNi_2O_4$, $LiCoO_2$, $LiNiO_2$, $LiMnO_2$, $Li_2MnO_3$, $LiFePO_4$, $LiNi_xCo_yO_2$ (where $0 < x \leq 0.15$ and $0 < y \leq 0.85$), $LiNi_{x1}Co_{y1}Mn_{z1}O_2$ (where $0 < x1 \leq 0.90$, $0 < y1 \leq 0.50$, $0 < z1 \leq 0.50$, and $x_1+y_1+z_1=1$), and $LiNi_pCo_qAl_rO_2$ (where $0 < p \leq 0.90$, $0 < q \leq 0.15$, $0 < r \leq 0.15$, and $p+q+r=1$).

A conducting agent, a binder, and a solvent used in the preparation of the cathode active material composition may be identical to those used in the preparation of the anode active material composition. If desired, a plasticizer may be added to the anode active material composition and the cathode active material composition to form pores in a cathode electrode plate and an anode electrode plate.

Amounts of the cathode active material, the conducting agent, the binder, and the solvent may be within ranges generally used in lithium batteries. At least one of the conducting agent, the binder, and the solvent may be omitted according to use and configuration of the lithium battery.

Next, a separator to be disposed between the anode and the cathode may be prepared. A suitable separator for use in a lithium battery may be used. The separator may have a low resistance to the migration of ions in an electrolyte and may have excellent electrolyte-retaining ability. Examples of the separator include glass fiber, polyester, Teflon, polyethylene, polypropylene, polytetrafluoroethylene (PTFE) or a combination thereof, each of which may be in the form of a non-woven or woven fabric. For example, a windable separator including polyethylene or polypropylene may be used for a lithium ion battery. A separator having good organic electrolyte solution-retaining ability may be used for a lithium ion polymer battery. As an example, the separator may be manufactured in the follow manner.

A polymer resin, a filler, and a solvent may be mixed together to prepare a separator composition. Then, the separator composition may be directly coated onto an electrode, and then dried to form a separator. In some implementations, the separator composition may be cast onto a support, and then dried to form a separator film, which may then be separated from the support and laminated onto an electrode to form the separator.

A suitable material that is commonly used as a binder for an electrode plate may be used as the polymer resin. Examples of the polymer resin include a vinylidenefluoride/hexafluoropropylene copolymer, polyvinylidene fluoride (PVDF), polyacrylonitrile, polymethylmethacrylate, or a mixture thereof.

Next, an electrolyte is prepared.

As an example, the electrolyte may be an organic electrolyte solution. In some implementations, the electrolyte may be in the solid phase. A material suitable for use as a solid electrolyte for a lithium battery may be used. For example, the electrolyte may be boron oxide and lithium oxynitride. The solid electrolyte may be formed on the anode by, for example, sputtering.

An organic electrolyte solution may be prepared by dissolving a lithium salt in an organic solvent.

The organic solvent may be a suitable solvent for use as an organic solvent in a lithium battery. Examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or mixtures thereof.

The lithium salt may be a suitable material available as a lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or a mixture thereof.

Figure 9:
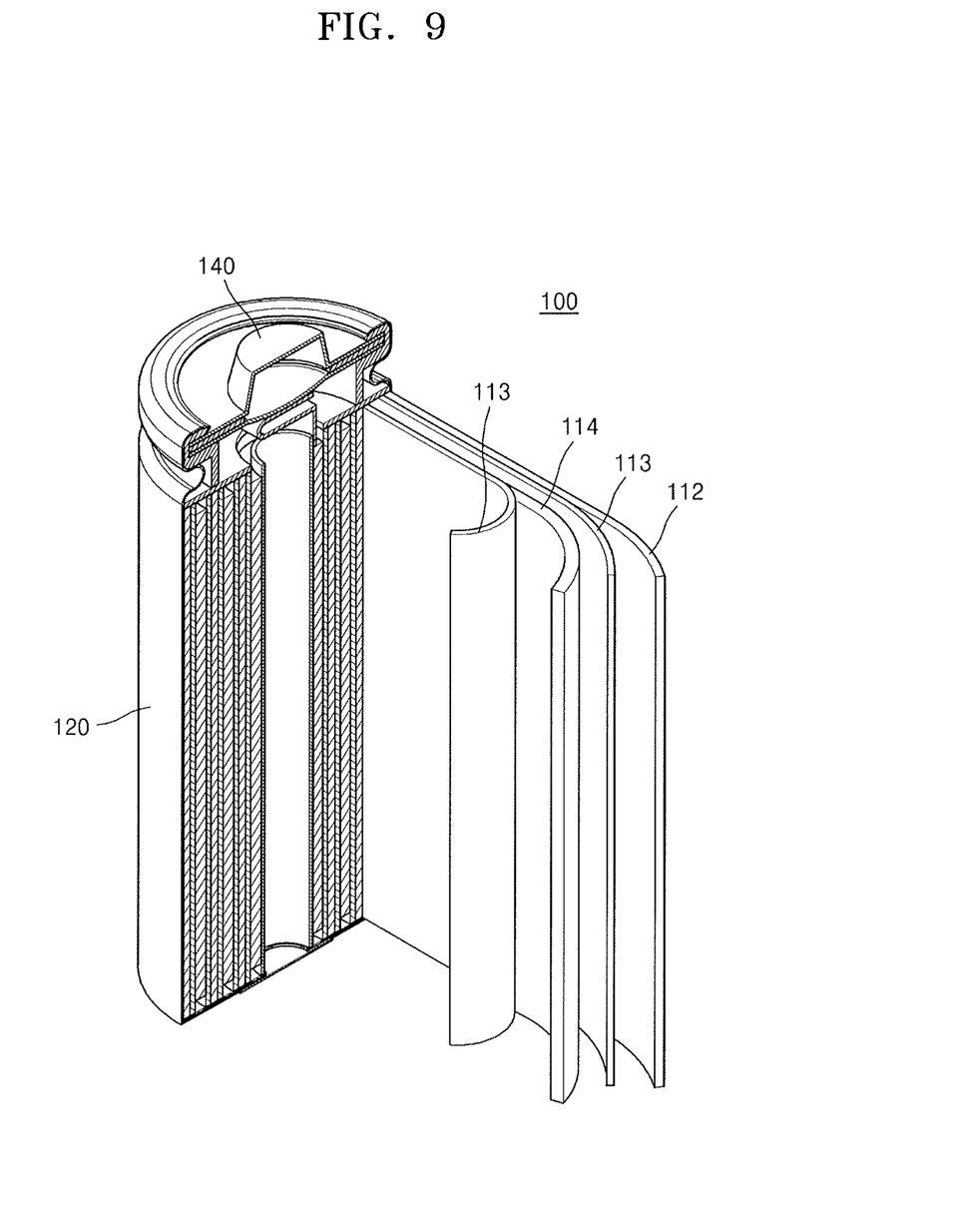
FIG. 9 illustrates an exploded perspective view depicting a lithium battery prepared according to an exemplary embodiment.

FIG. 9 illustrates an exploded perspective view depicting a lithium battery prepared according to an exemplary embodiment.

The lithium battery 100 may include a cathode 114, a separator 113, and an anode 112. The cathode 114, the separator 113, and the anode 112 may be wound or folded, and then sealed in a battery case 120. The battery case 120 may be filled with an organic electrolyte solution and sealed with a cap assembly 140, thereby completing the manufacture of the lithium battery 100. The battery case 120 may be a cylindrical type, a rectangular type, or a thin-film type. For example, the lithium battery may be a lithium ion battery, and may be prepared as a battery assembly. The battery assembly may be stacked in a bi-cell structure and impregnated with the organic electrolyte solution. The resulting structure may be put into a pouch and sealed, thereby completing the manufacture of a lithium ion polymer battery. The lithium battery may be useful in an electricity storage device, a electrically-drive tool, an electric vehicle (EV), or a plug-in hybrid electric vehicle (PHEV). In addition, a plurality of battery assemblies may be stacked to form a battery pack.

According to an embodiment, a method of preparing the composite anode active material includes mixing LiF nanoparticles and a metallic core alloyable with lithium to obtain a mixture thereof, and adding a carbonaceous material to the mixture to coat the metallic core with the carbonaceous material and the LiF nanoparticles through mechanical processing and heat treating.

LiF nanoparticles may be mixed with a metallic core alloyable with lithium to obtain a mixture thereof.

The metallic core alloyable with lithium and the LiF nanoparticles may be as described above.

A carbonaceous material may be added to the mixture to coat the metallic core with the carbonaceous material and the LiF nanoparticles through mechanical processing and heat treating.

The mechanical processing may include a milling method or a mechanofusion method. For example, the milling method may be performed using a ball mill. Examples of the use of a ball mill method include a planetary ball milling method, a low-speed milling method, and a high-speed milling method. The mechanofusion method is a method of adding a mixture into a rotating container, fixing the mixture on an inner wall of the container using centrifugal force, and compressing the mixture into a gap between the inner wall of the container and an arm head. To prepare a final product. i.e., the composite anode active material, amounts of the metallic core alloyable with lithium, the LiF nanoparticles, rotating numbers of the container, and a size of the container may be appropriately adjusted.

The heat treatment may be performed in an air or oxygen atmosphere at a temperature in a range of about 300° C. to about 700° C. For example, the heat treatment may be performed in the air or oxygen atmosphere at a temperature in a range of about 400° C. to about 600° C. The heat treatment may be performed for about 30 minutes to about 3 hours.

After coating the metallic core with the LiF nanoparticles and the carbonaceous material, the metallic core coated with the LiF nanoparticles and the carbonaceous material may be filtered through a filtering medium. The filtering medium may be a sieve or a filter. The sieve may have a mesh number from, for example, about 200 to about 400.

EXAMPLES

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1: Preparation of a Composite Anode Active Material

Si powders (manufactured by Kojundo Chemical Laboratory Co. Ltd., ≥99%) having an average particle diameter of 5 μm. Fe powders (manufactured by Kojundo Chemical Laboratory Co. Ltd., ≥99%) having an average particle diameter in a range of about 3 to about 5 μm, and C powders (graphite powder manufactured by Kojundo Chemical Laboratory Co. Ltd., ≥99%) having an average particle diameter of 5 μm were prepared as starting materials. The Si powders, the Fe powders, and the C powders were added at a ratio of 75:14:11 atom % (hereinafter, referred to as at %) in a planetary ball mill (model CM01 manufactured by Zoz GmbH Company), and then, the mixture was mixed and pulverized at a rotational speed of 500 rpm for 24 hours in a nitrogen atmosphere, thereby obtaining a Si—Fe—C alloy core.

LiF powders (manufactured by Sigma-Aldrich Company, ≥99%) having an average particle diameter in a range of about 2 to 3 μm were pulverized by using milling balls with a diameter of 0.3 mm, thereby obtaining LiF powders having an average particle diameter of about 257 nm.

The pulverized LiF powders were added and stirred with the Si—Fe—C alloy core in an amount of about 3 parts by weight based on 100 parts by weight of the Si—Fe—C alloy core to obtain a mixture thereof. The mixture was subjected to ball-milling using 3 mm zirconium balls, and then, pitch powders were added thereto in an amount of 10 parts by weight based on 100 parts by weight of the Si—Fe—C alloy. Then, the ball-milling was performed at a rotational speed of 100 rpm for 6 hours in an atmosphere, thereby coating the Si—Fe—C alloy core with the LiF powders and the pitch powders.

Afterwards, the Si—Fe—C alloy core coated with the LiF powders and the pitch powders was heat-treated at a temperature of 500° C. for 2 hours. The resulting product of the heat treatment was filtered through a 400 mesh sieve (manufactured by Sigma Aldrich Company), thereby preparing a composite anode active material.

Example 2: Preparation of a Composite Anode Material

A composite anode material was prepared in the same manner as in Example 1, except that the pulverized LiF powders were added and stirred with the Si—Fe—C alloy core in an amount of about 5 parts by weight based on 100 parts by weight of the Si—Fe—C alloy core to obtain a mixture thereof.

Example 3: Preparation of a Composite Anode Material

Expandable graphite (manufactured by GK Company) was heated at a temperature of 1,000° C. for 1 hour to expand, and then, the resulting product from the heat treatment was dispersed in ethanol. The dispersion was pulverized by using a homogenizer at a rotational speed of 12,000 rpm for 10 minutes. The pulverized mixture obtained therefrom was additionally pulverized to a size of 10 μm or less by using a micro fluidizer. The mixture obtained from the additional pulverization was filtered by using a filtering device, and the filtered product washed with ethanol, and then, dried in an oven at a temperature of 120° C., thereby obtaining graphene powders.

LiF powders (manufactured by Sigma-Aldrich Company, ≥99%) having an average particle diameter in a range of about 2 to about 3 μm were pulverized by using milling balls with a diameter of 0.3 mm, thereby obtaining LiF powders having an average particle diameter of about 257 nm.

The pulverized LiF powders were added and stirred with the Si—Fe—C alloy core in an amount of about 3 parts by weight based on 100 parts by weight of the Si—Fe—C alloy core to obtain a mixture thereof. The mixture was subjected to ball-milling using 3 mm zirconium balls, and then, the graphene powders were added thereto in an amount of 23 parts by weight based on 100 parts by weight of the Si—Fe—C alloy. Then, the ball-milling was performed at a rotational speed of 100 rpm for 6 hours in the atmosphere, thereby coating the Si—Fe—C alloy core with the LiF powders and the graphene powders.

Afterwards, the Si—Fe—C alloy core coated with the LiF powders and the graphene powders was heat-treated at a temperature of 500° C. for 2 hours. The resulting product of the heat treatment was filtered through a 400 mesh sieve (manufactured by Sigma Aldrich Company), thereby preparing a composite anode active material.

Comparative Example 1: Preparation of a Composite Anode Material

A composite anode material was prepared in the same manner as in Example 1, except that pitch powders were added and stirred with the Si—Fe—C alloy core in an amount of about 10 parts by weight based on 100 parts by weight of the Si—Fe—C alloy core to obtain a mixture thereof, and except that ball-milling was performed at a rotational speed of 100 rpm for 6 hours in the atmosphere to coat the Si—Fe—C alloy core with the pitch powders.

Comparative Example 2: Preparation of a Composite Anode Material

A composite anode material was prepared in the same manner as in Example 1, except that LiF powders (manufactured by Sigma-Aldrich Company, ≥99%) having an average particle diameter in a range of about 2 to about 3 μm were added and stirred with the Si—Fe—C alloy core in an amount of about 3 parts by weight based on 100 parts by weight of the Si—Fe—C alloy.

Comparative Example 3: Preparation of a Composite Anode Material

A composite anode material was prepared in the same manner as in Example 1, except that the pulverized LiF powders were added and stirred with the Si—Fe—C alloy core in an amount of about 10 parts by weight based on 100 parts by weight of the Si—Fe—C alloy.

Preparation of a Lithium Battery

Example 4: Preparation of a Coin-Type Half Cell

Powders of the composite anode active material of Example 1 were mixed with graphite (manufactured by Sigma Aldrich Company) at a weight ratio of 23.5:76.5, and then, styrene-butadiene rubber/carboxymethyl cellulose (SBR/CMC) (at a weight ratio of 1.5:1.5) was added thereto to be uniformly mixed together, thereby preparing a slurry for an anode active material.

A copper foil having a thickness of 10 μm was coated with the slurry for the anode active material to a thickness in a range of about 50 to about 60 μm according to a bar coating method. The coated copper foil was dried, and then, additionally vacuum-dried at a temperature of 110° C. for 6 hours, thereby preparing an anode electrode plate. The anode electrode plate was roll-pressed, thereby preparing a sheet-shaped anode for a coin-type cell. The anode had a capacity in a range of about 3.0 mAh/cm$^2$ to about 3.5 mAh/cm$^2$.

The anode was used to prepare coin-type half cell (CR2032 type) with a diameter of about 12 mm.

When preparing the coin-type half cell (CR2032 type), lithium metal was used as a counter electrode, and a lithium salt, in which 1.1M LiPF$_6$ and 0.2M LiBF$_4$ were dissolved in a mixed solvent of ethylene carbonate (EC), diethyl carbonate (DEC), and fluoroethylene carbonate (FEC) (at volume ratio of 2:6:2), was used as an electrolyte.

Example 5: Preparation of a Coin-Type Half Cell

A coin-type half cell (CR2032 type) was prepared in the same manner as in Example 4, except that in preparation of a slurry for an anode active material, powders of the composite anode active material of Example 2 were used instead of the powders of the composite anode active material of Example 1, and except that the powders of the composite anode active material of Example 2 were mixed with graphite (manufactured by Sigma Aldrich Company) at a weight ratio of 24:76. SBR/CMC (at a weight ratio of 1.5:1.5) was added thereto to be uniformly mixed together.

Example 6: Preparation of a Coin-Type Half Cell

A coin-type half cell (CR2032 type) was prepared in the same manner as in Example 4, except that in preparation of a slurry for an anode active material, powders of the composite anode active material of Example 3 were used instead of the powders of the composite anode active material of Example 1, and except that the powders of the composite anode active material of Example 3 were mixed with graphite (manufactured by Sigma Aldrich Company) at a weight ratio of 24:76. SBR/CMC (at a weight ratio of 1.5:1.5) was added thereto to be uniformly mixed together.

Comparative Example 4: Preparation of a Coin-Type Half Cell

A coin-type half cell (CR2032 type) was prepared in the same manner as in Example 4, except that in preparation of a slurry for an anode active material, powders of the composite anode active material of Comparative Example 1 were used instead of the powders of the composite anode active material of Example 1, and except that the powders of the composite anode active material of Comparative Example 1 were mixed with graphite (manufactured by Sigma Aldrich Company) at a weight ratio of 22.5:77.5. SBR/CMC (at a weight ratio of 1.5:1.5) was added thereto to be uniformly mixed together.

Comparative Example 5: Preparation of a Coin-Type Half Cell

A coin-type half cell (CR2032 type) was prepared in the same manner as in Example 4, except that in preparation of a slurry for an anode active material, powders of the composite anode active material of Comparative Example 2 were used instead of the powders of the composite anode active material of Example 1, and except that the powders of the composite anode active material of Comparative Example 2 were mixed with graphite (manufactured by Sigma Aldrich Company) at a weight ratio of 24:76. SBR/CMC (at a weight ratio of 1.5:1.5) was added thereto to be uniformly mixed together.

Comparative Example 6: Preparation of a Coin-Type Half Cell

A coin-type half cell (CR2032 type) was prepared in the same manner as in Example 4, except that in preparation of a slurry for an anode active material, powders of the composite anode active material of Comparative Example 3 were used instead of the powders of the composite anode active material of Example 1, and except that the powders of the composite anode active material of Comparative Example 3 were mixed with graphite (manufactured by Sigma Aldrich Company) at a weight ratio of 23.5:76.5. SBR/CMC (at a weight ratio of 1.5:1.5) was added thereto to be uniformly mixed together.

Comparative Example 7: Preparation of a Coin-Type Half Cell

A coin-type half cell (CR2032 type) was prepared in the same manner as in Example 4, except that in preparation of a slurry for an anode active material, powders of the composite anode active material of Comparative Example 1 were used instead of the powders of the composite anode active material of Example 1. The powders of the composite anode active material of Comparative Example 1 were mixed with graphite (manufactured by Sigma Aldrich Company) at a weight ratio of 22.5:77.5. SBR/CMC (at a weight ratio of 1.5:1.5) was added thereto to be uniformly mixed together, and that the slurry was used to prepare an anode for a coin-type cell.

The anode for the coin-type cell was prepared as follows.

A copper foil having a thickness of 10 μm was coated with the slurry for the anode active material to a thickness in a range of about 50 to about 60 μm according to a bar coating method. The coated copper foil was then dried to prepare an anode electrode plate.

The anode electrode plate was coated with a solution in which LiF powders (Aldrich Company, ≥99%) having an average particle diameter in a range of about 2 to about 3 μm) were dispersed in deionized water (10 weight %). The coated anode electrode plate was dried, and then, additionally vacuum-dried at a temperature of 110° C. for 6 hours, thereby preparing an anode electrode plate on which a LiF coating layer was formed to a thickness in a range of about 7 to about 10 μm. The anode electrode plate on which the LiF coating layer was formed to a thickness in a range of about 7 to about 10 μm was roll-pressed, thereby preparing a sheet-shaped anode for a coin-type cell. The anode had a capacity in a range of about 3.0 mAh/cm² to about 3.5 mAh/cm².

Comparative Example 8: Preparation of a Coin-Type Half Cell

A coin-type half cell (CR2032 type) was prepared in the same manner as in Example 4, except that in preparation of a slurry for an anode active material, powders of the composite anode active material of Comparative Example 1 were used instead of the powders of the composite anode active material of Example 1 The powders of the composite anode active material of Comparative Example 1 were mixed with graphite (manufactured by Sigma Aldrich Company) at a weight ratio of 22.5:77.5. SBR/CMC (at a weight ratio of 1.5:1.5) was added thereto to be uniformly mixed together. The slurry was used to prepare an anode for a coin-type cell.

The anode for the coin-type cell was prepared as follows.

A copper foil having a thickness of 10 μm was coated with the slurry for the anode active material to a thickness in a range of about 50 to about 60 μm according to a bar coating method. The coated copper foil was then dried to prepare an anode electrode plate.

LiF powders (manufactured by Sigma-Aldrich Company, ≥99%) having an average particle diameter in a range of about 2 to about 3 μm were pulverized by using milling balls with a diameter of 0.3 mm, thereby obtaining LiF powders having an average particle diameter of about 257 nm.

The anode electrode plate was coated with a solution in which the pulverized LiF powders were dispersed in deionized water (10 weight %). The coated anode electrode plate was dried, and then, additionally vacuum-dried at a temperature of 110° C. for 6 hours, thereby preparing an anode electrode plate on which a LiF coating layer was formed to a thickness in a range of about 7 to about 10 μm. The anode electrode plate on which the LiF coating layer was formed to a thickness in a range of about 7 to about 10 μm was roll-pressed, thereby preparing a sheet-shaped anode for a coin-type cell. The anode had a capacity in a range of about 3.0 mAh/cm² to about 3.5 mAh/cm².

The configurations of the composite anode active materials or the anode included in the coin-type half cells of Examples 4 to 6 and Comparative Examples 4 to 8 are summarized in Table 1.

TABLE 1

| | Area on which a coating layer was formed | Components included in a coating layer | Amount of LiF (based on 100 parts by weight of a Si—Fe—C alloy core) |
|---|---|---|---|
| Example 4 | Si—Fe—C alloy core | LiF having an average particle diameter of about 257 nm and pitch | 3 parts by weight |
| Example 5 | Si—Fe—C alloy core | LiF having an average particle diameter of about 257 nm and pitch | 5 parts by weight |
| Example 6 | Si—Fe—C alloy core | LiF having an average particle diameter of about 257 nm and graphene | 23 parts by weight |
| Comparative Example 4 | Si—Fe—C alloy core | Pitch | x |
| Comparative Example 5 | Si—Fe—C alloy core | LiF having an average particle diameter in a range of about 2 to about 3 μm and pitch | 3 parts by weight |
| Comparative Example 6 | Si—Fe—C alloy core | LiF having an average particle diameter of about 257 nm and pitch | 10 parts by weight |
| Comparative Example 7 | Surface of a pitch powder-coated anode for a Si—Fe—C alloy | LiF having an average particle diameter in a range of about 2 to about 3 μm | x |
| Comparative Example 8 | Surface of a pitch powder-coated anode for a Si—Fe—C alloy | LiF having an average particle diameter of 257 | x |

Analysis Example 1: Scanning Electron Microscope (SEM) Images

Surfaces of the composite anode active materials of Examples 1 and 2 and Comparative Examples 1 and 2 and the anodes included in the coin-type half cells of Comparative Examples 7 and 8 were observed by using an SEM at 500 to 2,000 magnifications, and the results are illustrated in FIGS. 2 to 7. The SEM used herein was S-5500 by Hitachi.

Figure 2:
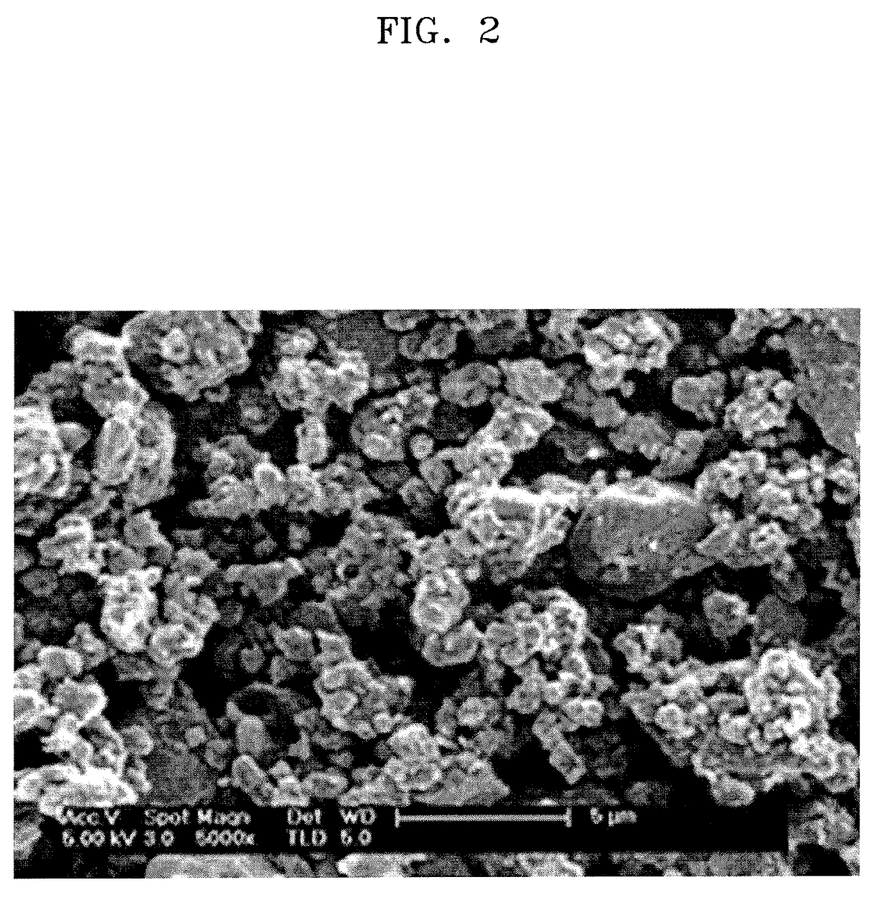
FIGS. 2 to 5 illustrate scanning electron microscope (SEM) images at 500 to 1,000 magnifications and each showing composite anode active materials prepared according to Examples 1 and 2 and Comparative Examples 1 and 2.
Figure 3:
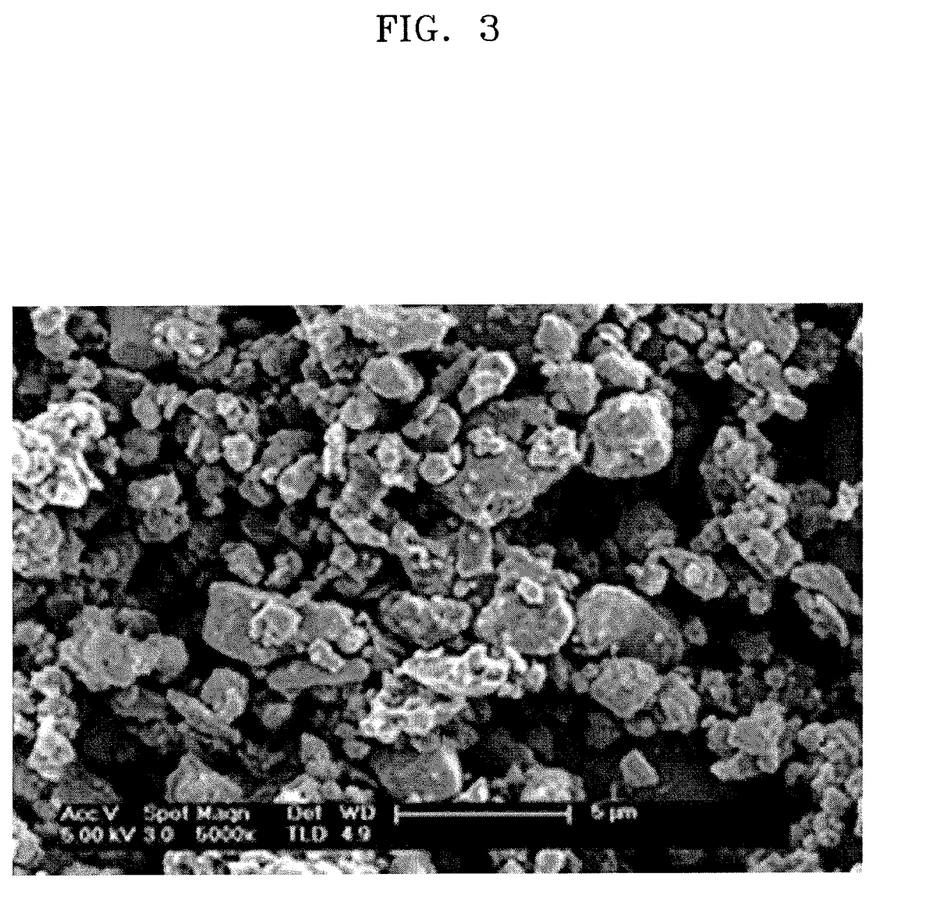

Referring to FIGS. 2 and 3, it was may be observed that the composite anode active materials of Examples 1 and 2 each had a coating layer coated on the Si—Fe—C alloy core, wherein the coating layer includes LiF powders having an average particle diameter of about 257 nm and pitch powders. In addition, it was observed that the LiF powders having the average particle diameter of about 257 nm had a spherical or oval shape and were uniformly distributed with the pitch powder on the Si—Fe—C alloy core.

Figure 4:
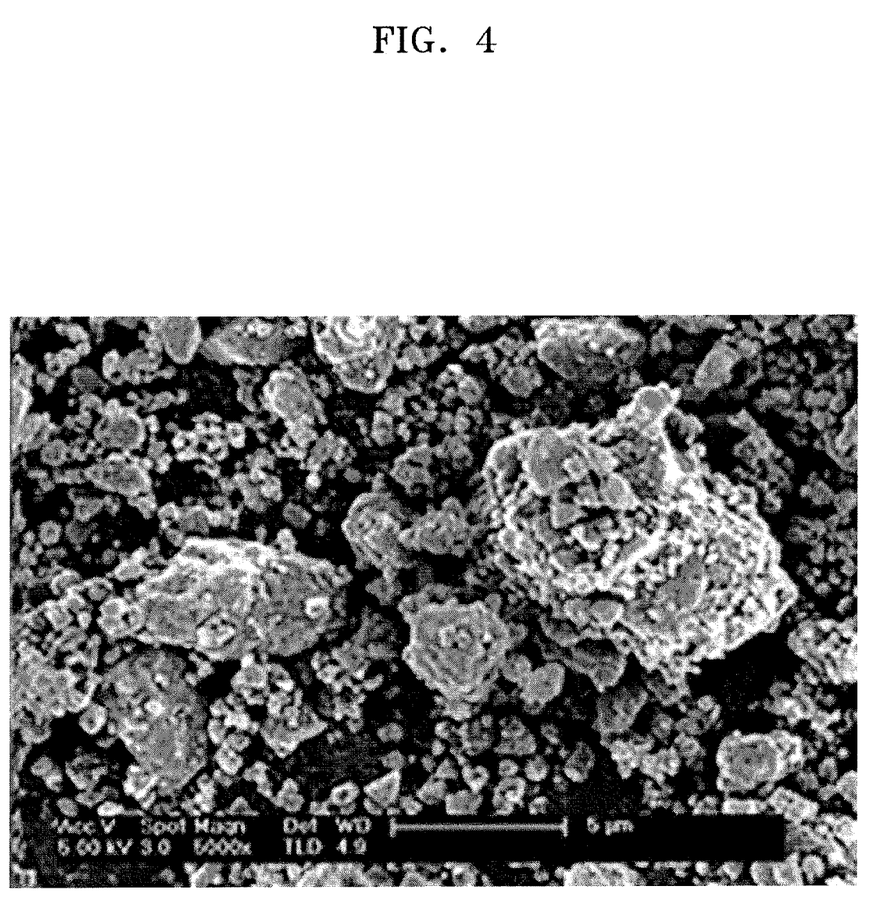

Referring to FIG. 4, it may be observed that the composite anode active material of Comparative Example 1 had a coating layer coated on the Si—Fe—C alloy core, wherein the coating layer includes pitch powders having an average particle diameter in a range of about 0.01 to about 0.1 μm.

Figure 5:
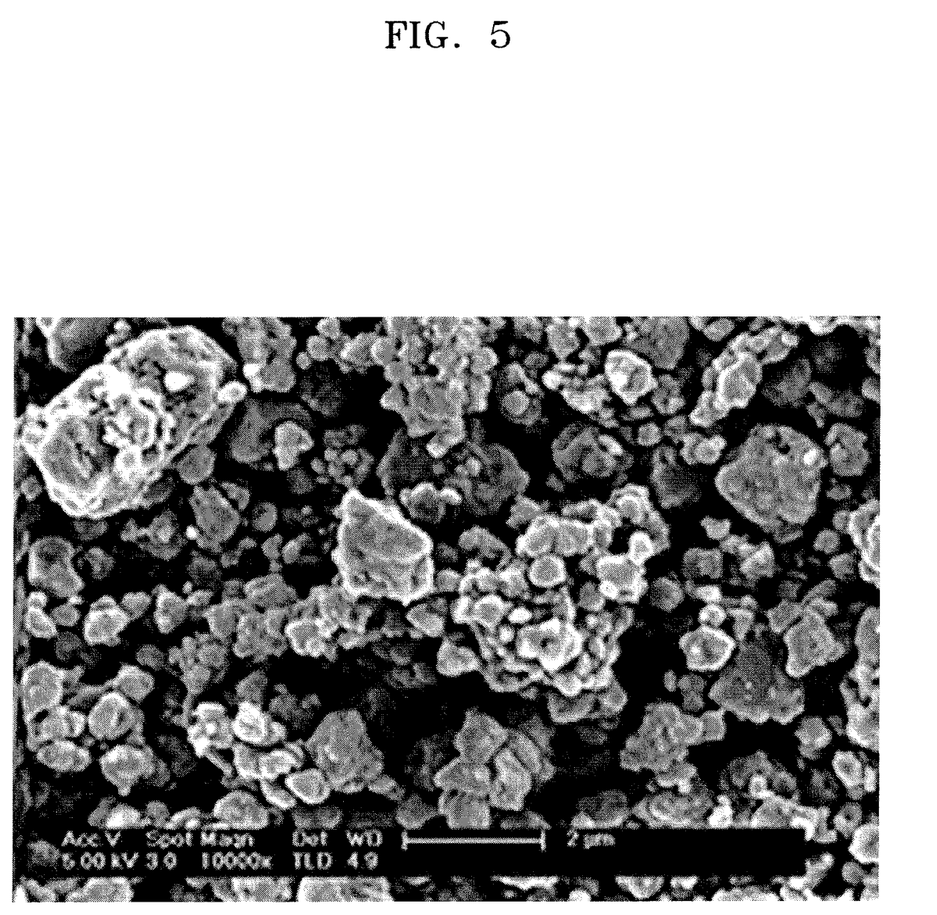

Referring to FIG. 5, it was may be observed that the composite anode active material of Comparative Example 2 had a coating layer coated on the Si—Fe—C alloy core, wherein the coating layer includes LiF powders having an average particle diameter in a range of about 2 to about 3 μm and pitch powders. In addition, it was may be observed that the LiF powders having the average particle diameter in a range of about 2 to about 3 μm in the coating layer of the composite anode active material of Comparative Example 2 were less uniformly distributed on the Si—Fe—C alloy core than the LiF powders having an average particle diameter of about 257 nm in the coating layer of the composite anode active materials of Examples 1 and 2.

Figure 6:
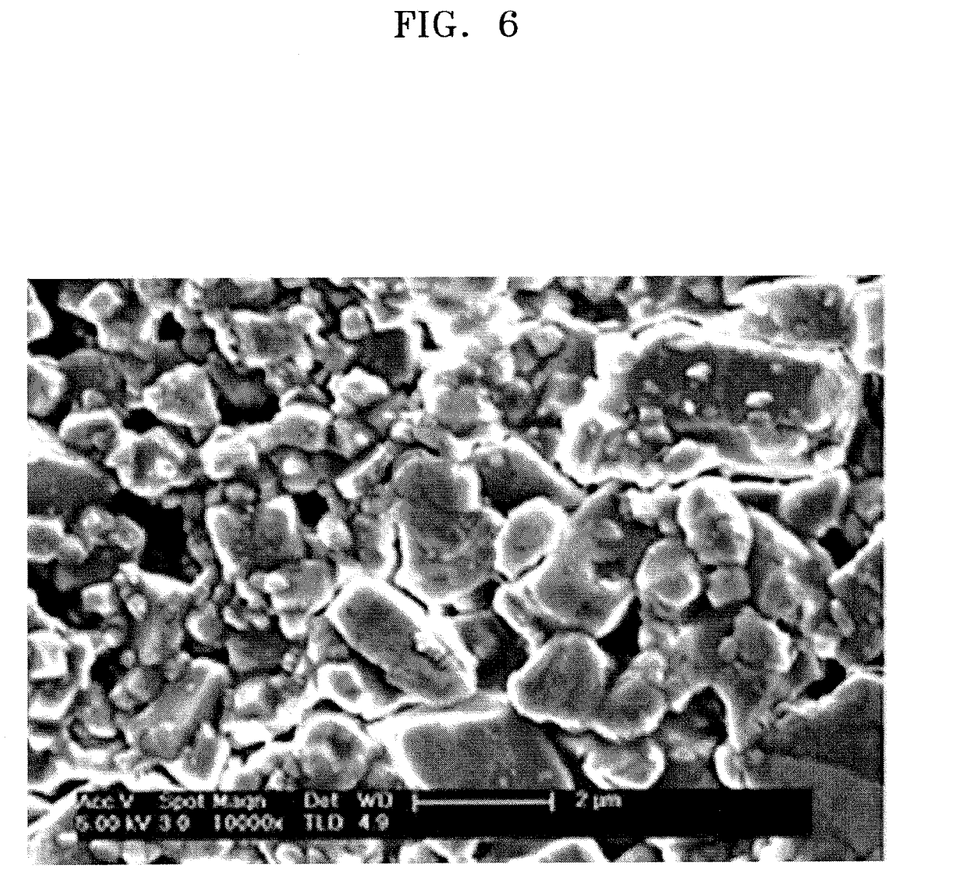
FIGS. 6 and 7 illustrate images at a magnification of 2000 and showing a surface of an anode each included in lithium batteries prepared according to Comparative Examples 7 and 8.

Referring to FIG. 6, it was may be observed that the coating layer including the LiF powders and the pitch powders and distributed on the Si—Fe—C alloy core were tightly disposed on the surface of the anode included in the coin-type half cells of Comparative Example 7. Accordingly, it may be inferred that intercalation/deintercalation of lithium ions between the Si—Fe—C alloy core and the electrolyte can be interrupted during charge and discharge of the lithium battery.

Figure 7:
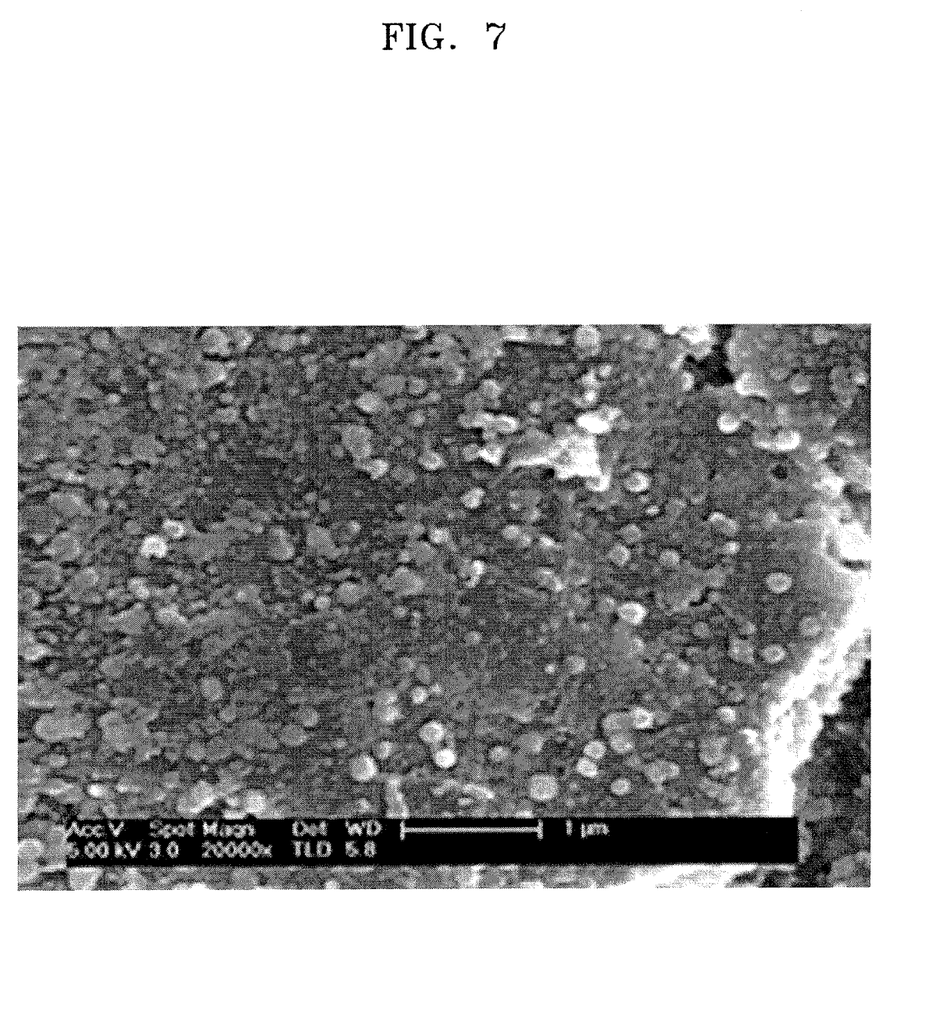

Referring to FIG. 7, it was may be observed that the coating layer including the LiF powders and the pitch powders and distributed on the Si—Fe—C alloy core were tightly disposed on the surface of the anode included in the coin-type half cells of Comparative Example 8. Accordingly, as in the case of the lithium battery of Comparative Example 7, it can be inferred that intercalation/deintercalation of lithium ions between the Si—Fe—C alloy core and the electrolyte can be interrupted during charge and discharge of the lithium battery.

Evaluation Example 1: Test on Peel Strength—Evaluation of Adhesion of an Anode Electrode Plate To evaluate adhesion of the anode electrode plates of the lithium batteries of Examples 4 to 6 and Comparative Examples 4 and 5, a tester for measuring tensile strength was used to measure a peel strength of an anode electrode plate. The tester used herein was manufactured by Shimadzu. A sample for measuring a peel strength was prepared for the test on peel strength by cutting the anode electrode plate for the lithium battery to a size of 12 cm×2.54 cm, attaching a double-sided tape (3 cm×2.54 cm) on one surface of the cut electrode plate, and then, attaching a slide glass having a larger size than the sample on the anode electrode plate. A portion of a grip of the tester was positioned on the slide glass was while another portion of the grip of the tester was positioned on an electrode plate surface where the slide glass was not attached. Then, the both portions of the grip were pulled in opposite directions to each other, thereby measuring peel strength of the surfaces attached to both portions of the grip. The results are shown in Table 2.

TABLE 2

|  | Peel strength (gf/mm) |
| --- | --- |
| Example 4 | 1.58 |
| Example 5 | 1.45 |
| Example 6 | 1.43 |
| Comparative Example 4 | 1.30 |
| Comparative Example 5 | 1.03 |

Referring to Table 2, it was may be seen that the anode electrode plates for the lithium batteries of Examples 4 to 6 had stronger peel strength than the anode electrode plates for the lithium batteries of Comparative Examples 4 and 5.

Evaluation Example 2: Evaluation on Conductivity of an Electrode Plate

Conductivity of the anode electrode plates of the lithium batteries of Examples 6 and Comparative Examples 4 to 6 was evaluated by using an electric conductivity tester. The results are shown in Table 3.

TABLE 3

|  | Conductivity of an electrode plate (S/m) |
| --- | --- |
| Example 6 | 1.52 |
| Comparative Example 4 | 1.49 |
| Comparative Example 5 | 1.35 |
| Comparative Example 6 | 1.18 |

Referring to Table 3, it was may be seen that the anode electrode plate for the lithium battery of Example 6 had higher conductivity than the anode electrode plates for the lithium batteries of Comparative Examples 4 to 6.

Evaluation Example 3: Evaluation of Charge and Discharge Characteristics—Evaluation of Lifespan Characteristics Charge and discharge characteristics of the lithium batteries of Examples 4 to 6 and Comparative Examples 4 to 6 and 8 were evaluated under the following conditions.

The lithium batteries of Examples 4 to 6 and Comparative Examples 4 to 6 and 8 were charged with 0.2 C at room temperature until a voltage thereof reached 4.2 V, and then, were discharged with 0.2 C until a cut-off voltage thereof reached 2.5 V. Capacities at the charge and the discharge (i.e., the charge capacity and the discharge capacity at the $1^{st}$ cycle) were measured.

Next, the lithium batteries of Examples 4 to 6 and Comparative Examples 4 to 6 and 8 were charged with 1 C as described above, and then, discharged with 1 C until a voltage thereof reached 2.5 V. Capacities at the charge and the discharge were measured. Such a charge and discharge process was repeated, and the charge capacity and the discharge capacity at the 50$^{th}$ cycle were separately charged Lifespan characteristics of the lithium batteries of Examples 4 to 6 and Comparative Examples 4 to 6 and 8 were measured by calculating capacity retention (%) calculated according to [Equation 1]. The results are shown in Table 4 and FIG. 8.

Capacity retention (%)=[(Discharge capacity at the 50$^{th}$ cycle/Discharge capacity at the 1$^{st}$ cycle)]× 100 [Equation 1]

TABLE 4

|  | Discharge capacity at the 1$^{st}$ cycle (1C/1C) mAh/g | Discharge capacity at the 50$^{th}$ cycle (1C/1C) mAh/g | Capacity retention % |
| --- | --- | --- | --- |
| Example 4 | 512.78 | 462.53 | 90.2 |
| Example 5 | 508.99 | 453.51 | 89.1 |
| Example 6 | 515.13 | 485.25 | 94.2 |
| Comparative Example 4 | 517.87 | 421.55 | 81.4 |
| Comparative Example 5 | 504.49 | 374.33 | 74.2 |
| Comparative Example 6 | 503.84 | 397.53 | 78.9 |
| Comparative Example 8 | 505.58 | 409.01 | 80.9 |

Figure 8:
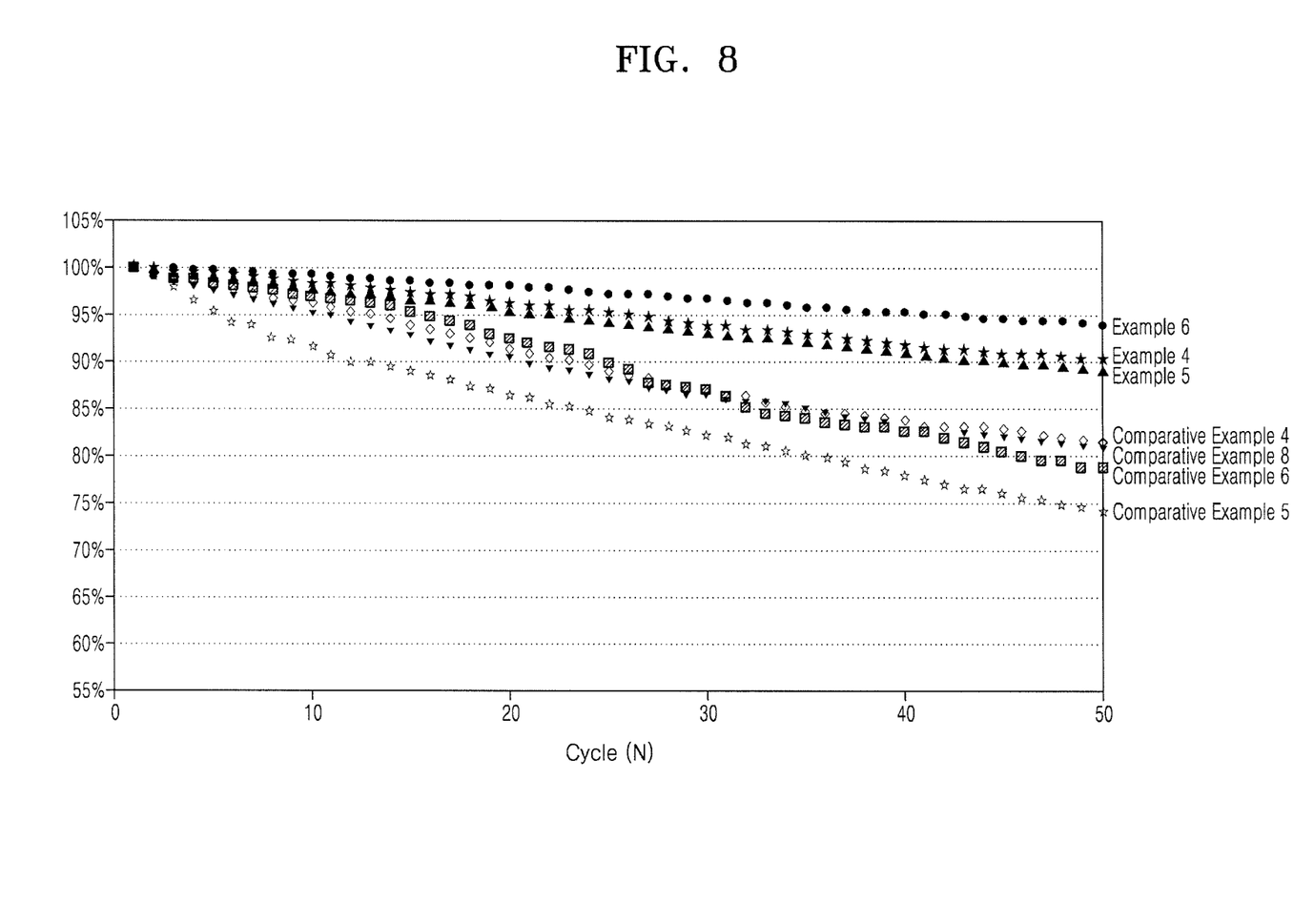
FIG. 8 illustrates a graph showing capacities with respect to cycle number of lithium batteries prepared according to Examples 4 to 6 and Comparative Examples 4 to 6 and 8.

Referring to Table 4 and FIG. 8, it may be seen that the lithium batteries of Examples 4 to 6 had better capacity retentions than the lithium batteries of Comparative Examples 4 to 6 and 8. That is, it may be seen that the lithium batteries of Examples 4 to 6 had improved lifespan characteristics compared to the lithium batteries of Comparative Examples 4 to 6 and 8.

By way of summation and review, it is desirable for a lithium secondary battery to have high energy density and/or a long lifetime.

As an anode active material for a lithium secondary battery, a carbon-based material such as graphite is mainly used. An anode active material such as graphite has a theoretical discharge capacity of about 360 mAh/g, and thus there is a limit in manufacturing a high-capacity lithium battery.

In this regard, as an anode active material that can replace graphite, a metallic material alloyable with lithium, such as silicon (Si) or tin (Sn), is noted.

For example, Si has a theoretical capacity of 4,200 mAh/g. However, if Si is used alone, Si may have a rapid decrease in its capacity upon volume expansion caused during a charge and discharge process. Such volume expansion may be due to the fact that one Si atom can accommodate up to 4.4 lithium atoms, such that volume expansion may be as much as 400%. The volume expansion may cause cracks in a Si particle. Subsequently, breakdown caused by the cracking may also cause electrolytic degradation, resulting in the formation of a solid electrical interface (SEI) layer on a surface of the Si particle. Due to irregular occurrence of the cracking in the Si particle, debris particles consequently isolated due to the cracking may not be able to participate in an electrochemical reaction. Moreover, due to the formation of a new SEI layer, a battery may experience a loss of capacity.

To address the issue of loss of capacity, studies on complement capacity of an anode active material have been made where, instead of using a metallic material alloyable with lithium, such as Si and/or Sn, alone, the metallic material alloyable with lithium is mixed with a carbon-based anode active material or an alkali metallic material.

However, use of the anode active material has not been enough to sustain the capacity and accordingly, improve lifespan characteristics.

Therefore, an anode active material having improved lifespan characteristics, a lithium battery including the anode active material, and a method of preparing the anode active material are desirable.

Embodiments provide a composite anode active material having improved lifespan characteristics. Embodiments also include a lithium battery including the composite anode active material. Embodiments also include a method of preparing the composite anode active material.

As described above, according to one or more of the above exemplary embodiments, a composite anode active material includes: a metallic core alloyable with lithium; and a coating layer disposed on the metallic core and including lithium fluoride (LiF) nanoparticles and carbonaceous materials. A lithium battery including the composite anode active material may accordingly have improved lifespan characteristics. In addition, a method of preparing the composite anode active material is provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A composite anode active material, comprising:
a metallic core alloyable with lithium; and
a coating layer on the metallic core, the coating layer including lithium fluoride (LiF) nanoparticles directly on the metallic core and a carbonaceous material directly on the metallic core, wherein:
the LiF nanoparticles include primary particles having an average particle size in a range of about 10 nm to about 900 nm, and
the metallic core includes a silicon-based alloy represented by Formula 1:

$$xSi\text{-}yFe\text{-}zM \qquad \text{[Formula 1]}$$

wherein, in Formula 1,
$50 \leq x \leq 90$, $5 \leq y \leq 30$, $5 \leq z \leq 30$, $x+y+z=100$; and
M is at least one selected from carbon (C), aluminum (Al), titanium (Ti), chromium (Cr), manganese (Mn), cobalt (Co), nickel (Ni), magnesium (Mg), copper (Cu), sulfur (S), selenium (Se), tellurium (Te), tin (Sn), indium (In), gallium (Ga), germanium (Ge), arsenic (As), lead (Pb), palladium (Pd), bismuth (Bi), zinc (Zn), tungsten (W), and silver (Ag).

2. The composite anode active material as claimed in claim 1, wherein the carbonaceous material includes at least one of graphite, a carbon nanotube, a carbon nanofiber, a carbon nanorod, a carbon nanoribbon, graphene, soft carbon, hard carbon, meso-phase pitch carbide, and sintered cork.

3. The composite anode active material as claimed in claim 1, wherein the metallic core including the silicon-based alloy has an average particle diameter D50 in a range of about 0.3 μm to about 20 μm.

4. The composite anode active material as claimed in claim 1, wherein the LiF nanoparticles are present in an amount ranging from about 0.1 parts by weight to about 7.0 parts by weight based on 100 parts by weight of the metallic core.

5. The composite anode active material as claimed in claim 1, wherein the carbonaceous material is present in an amount ranging from about 1.0 part by weight to about 30 parts by weight based on 100 parts by weight of the metallic core.

6. A lithium battery, comprising:
  a cathode including a cathode active material;
  an anode including the composite anode active material according to claim 1; and
  an electrolyte disposed between the cathode and the anode.

7. A method of preparing the composite anode active material of claim 1, the method comprising:
  mixing the lithium fluoride (LiF) nanoparticles and the metallic core alloyable with lithium to obtain a mixture thereof; and
  adding the carbonaceous material to the mixture to coat the metallic core with the carbonaceous material and the LiF nanoparticles through mechanical processing and heat treating.

8. The method as claimed in claim 7, wherein the mechanical processing includes a milling process or a mechanofusion process.

9. The method as claimed in claim 7, wherein the heat treating is performed at a temperature in a range of about 300° C. to about 700° C. in air or in an oxygen atmosphere.

* * * * *